United States Patent [19]
Probst

[11] Patent Number: 5,435,712
[45] Date of Patent: Jul. 25, 1995

[54] DEVICE EMPLOYING VIBRATION FOR TRANSPORTING PLASTIC SUBSTANCES WITH A HIGH COEFFICIENT OF FRICTION

[75] Inventor: Gastone Probst, Viganello, Switzerland

[73] Assignee: Ixtlan Aktiengesellschaft, Friesen, Liechtenstein

[21] Appl. No.: 159,511

[22] Filed: Nov. 30, 1993

[30] Foreign Application Priority Data

Oct. 11, 1993 [CH] Switzerland ............... 3054/93

[51] Int. Cl.⁶ ............... B28B 17/00; B29B 13/08
[52] U.S. Cl. ............... 425/174.2; 13.7/13; 13.7/827; 264/23; 264/70; 264/71; 425/542; 425/378.1
[58] Field of Search ............... 264/22, 23, 70, 71, 264/; 425/174.2, 174, 542, 378.1; 137/13, 827, 828

[56] References Cited

U.S. PATENT DOCUMENTS

| | | | |
|---|---|---|---|
| 3,099,993 | 8/1963 | Smith | 137/13 |
| 3,169,589 | 2/1965 | Bodine | 425/174.2 |
| 3,246,055 | 4/1966 | Pendleton | 425/174.2 |
| 4,092,089 | 5/1978 | Bocker et al. | 425/378.1 |
| 4,118,164 | 10/1978 | Wenger et al. | 425/378.1 |
| 4,247,273 | 1/1981 | Pogzeba et al. | 425/174.4 |
| 4,597,921 | 7/1986 | Walling et al. | 264/23 |
| 4,643,660 | 2/1987 | Capelle | 425/378.1 |
| 4,685,946 | 8/1987 | Desks et al. | 264/23 |
| 4,740,146 | 4/1988 | Angelbeck | 425/174.2 |
| 4,921,415 | 5/1990 | Thomas et al. | 425/174.2 |

FOREIGN PATENT DOCUMENTS

| | | | |
|---|---|---|---|
| 394958 | 10/1990 | European Pat. Off. | 425/174.2 |
| 1477607 | 3/1967 | France | 425/174.2 |
| 60-105513 | 6/1985 | Japan | 425/174.2 |
| 1-196560 | 8/1989 | Japan | 425/174 |
| 4-90309 | 3/1992 | Japan | 425/174.2 |

*Primary Examiner*—Knanh P. Nguyen
*Attorney, Agent, or Firm*—Young & Thompson

[57] ABSTRACT

In a device for transporting in the plastic state substances with a high coefficient of friction via a pipe (10) in which the substances and the pipe (10) are caused to vibrate relative to one another by one or more vibration generators, the vibrations are transmitted to the above-mentioned pipe (10). Each of the generators (5) can transmit the vibrations to a fluid contained in chambers (7) that are arranged coaxially with and outside of the pipe (10), with the fluid being in contact with the pipe itself.

7 Claims, 4 Drawing Sheets

DEVICE EMPLOYING VIBRATION FOR TRANSPORTING PLASTIC SUBSTANCES WITH A HIGH COEFFICIENT OF FRICTION

BACKGROUND OF THE INVENTION
1. Field of the Invention

The invention applies to all branches of industry whose production cycles include phases that make it necessary to transport via conveyor pipes substances in the plastic state which exhibit a high coefficient of sliding and/or internal friction under said conditions.

2. Description of Related Art

In the present state of the art, some devices are known which, in order to facilitate transport as mentioned above via the above-mentioned pipes in their final leg before reaching the discharge nozzle and through the above-mentioned nozzle, use sonotrodes or similar devices to induce vibrations in order to take advantage of any thixotropic behavior that may exist in the substance that is being transported, transmitting high-frequency vibrations directly to said substance.

This case is illustrated in, e.g., patent application DE 06645 A1, in which the substance is a ceramic in the liquid state.

The problems that are not solved by these types of devices are mainly the following: first, because the temperature of most molten substances is very high, the sonotrode is quickly worn down since cavitation phenomena in its molecular structure are aggravated and accelerated.

Second, in the segments of pipe that are further away from the discharge nozzle, such devices do not help to reduce the resistance of the substances to flowing along the pipe itself, and the concept of using more sonotrodes that penetrate into the substance after going through the walls of the pipe involves complications that make this approach impractical from both the engineering and economic standpoints.

It should be pointed out that this type of problem exists in many marketing sectors, including very different ones.

For example, in preparing portions of butter for packaging in the "continuous" mode, the method used is to heat the surface of the mass of the butter flowing inside the pipes in order to reduce the coefficient of friction, but raising the temperature in this way obviously does nothing to improve the organoleptic and microbiological properties of the product.

Another case where a high coefficient of friction turns out to be an insurmountable obstacle is that of the molding of plastics having optimal physical and mechanical characteristics that make it advantageous to use them in large-scale industrial production.

Such substances, which would first be melted and then injected into molds, cannot be used because it is virtually impossible, or at least too complicated and expensive, to make them flow, even in the plastic state after they are melted, via the pipes that carry them to the exit hole that would cast them into the above-mentioned mold.

There are quite a number of these substances, but the following examples can be cited: PFTE (polytetrafluoroethylene) and polyimide (PI) molding compounds.

Another case where a reduction in the coefficient of sliding and/or internal friction could lead to a considerable reduction in production cost and an improvement in the quality of the product is the production of optical fibers: today friction and the internal viscosity of the molten glass cause wear on the drawing mills which exert considerable traction on the individual fibers; this causes a decline in the homogeneity and isotropy of the resulting reflective surfaces, resulting in greater photon dispersion and rapid drops in the power of the signal being transmitted.

SUMMARY OF THE INVENTION

With regard to the problems outlined above, the present inventor has attempted to provide an appropriate solution: a device that is able to cause the substances and the pipes in which they run to vibrate relative to one another and possibly to melt over virtually the entire length of the pipes themselves, without creating any particular economic or engineering problems.

In particular, the inventor has proposed a device for transporting substances in the plastic state which have a high coefficient of sliding and/or internal friction along a conveyor pipe in which one or more vibration generators are used to cause the substances and the pipe to vibrate relative to one another, wherein the above-mentioned vibrations are transmitted only to the pipe itself.

BRIEF DESCRIPTION OF THE DRAWINGS

A more detailed description will now be given of the device of the invention, making reference to the attached drawings, where.

DETAILED DESCRIPTION OF PREFERRED EMBODIMENTS

Figure 1:
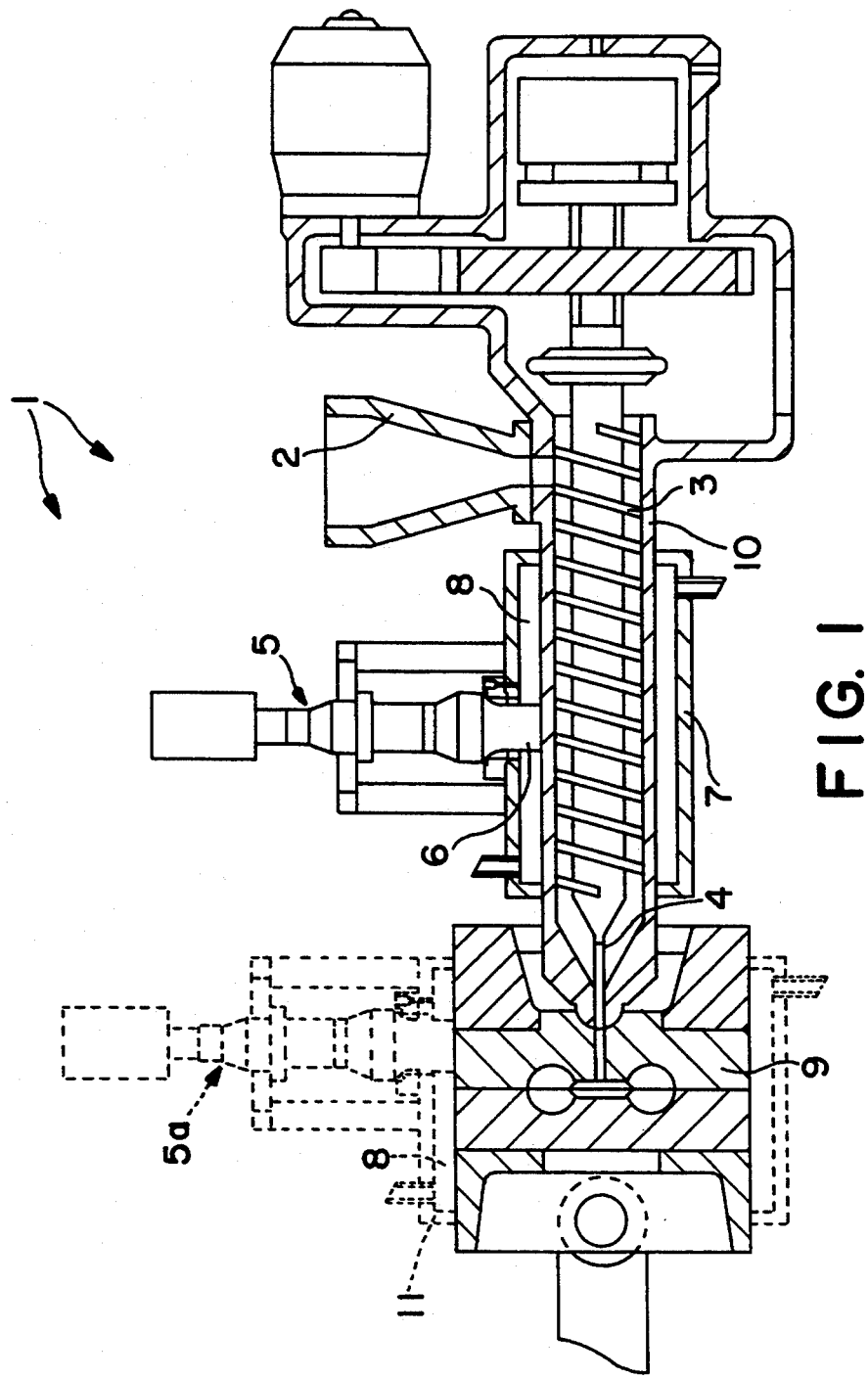
FIG. 1 shows an example of a preferred embodiment of the device, comprising a single sonotrode for the entire path traversed by the substances in the plastic state.

FIG. 1 shows the device of the invention, used in the case where plastics such as the above-mentioned PTFE and PI are being worked by being injected into molds 9.

These substances are poured in the granular and powder state into a hopper 2, which conveys them into a pipe 10 that is occupied by a screw 3 which, by turning, feeds the material forward toward the hole 4 and subsequent injection into the mold 9.

As the material moves along the pipe 10, it is subjected to the heat that is required to melt it, such that, after covering a predetermined portion of its path, it is in the plastic state.

The heat can be supplied to the material by conduction through the walls of the pipe 10 by the fluid 8 that is contained in an annular chamber 7 which is arranged coaxially with the pipe 10.

Since, as mentioned, the substances exhibit a very high coefficient of sliding and/nor internal friction when in the plastic state after being melted, the effect of this friction on the walls of the pipe 10 can be considerably reduced by causing these walls to vibrate at high frequency. These vibrations are produced by a generator-converter 5, which terminates in a sonotrode 6 that is immersed in the above-mentioned fluid 8.

Since the chamber 7 is hermetically sealed and since the fluids are incompressible, this ensures that the vibrations are transmitted fairly homogeneously to the entire surface of the pipe 10 that is in direct contact with the fluid 8.

For the particular case of injection for molding, the inventor has also provided for using another vibration generator 5a, like the one described above, as well as for connecting this generator to a sealed chamber 11 containing the fluid 8 on mold 9, where it can also cause the latter to vibrate, making it possible to fill the mold perfectly, without bubbles or other defects.

Figure 2:
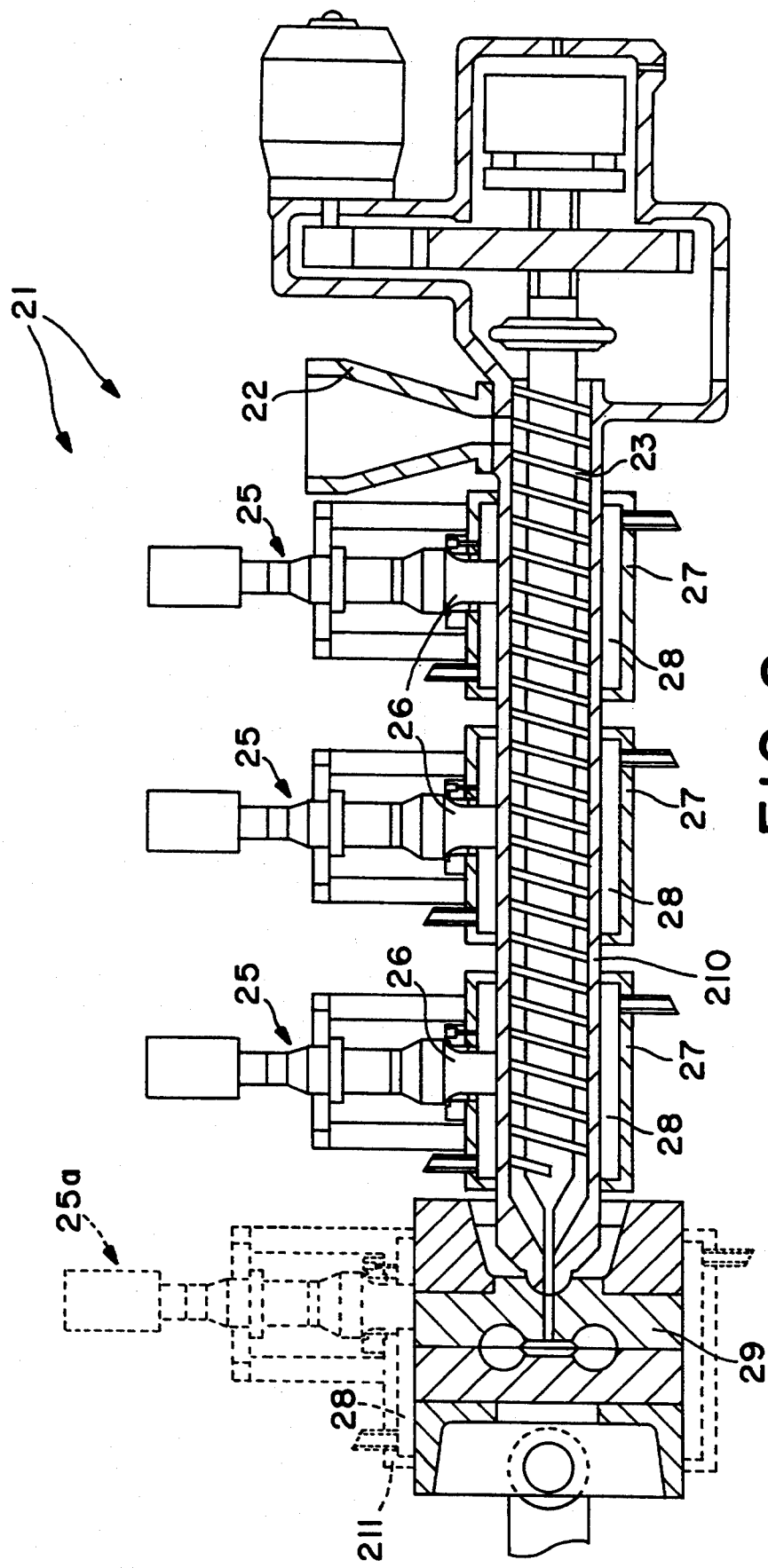
FIG. 2 shows another embodiment in which the device comprises several sonotrodes arranged "series;"

FIG. 2 shows another embodiment of the device 21, which is also used for the same procedure of injecting into a mold 29 and which is distinguished from the one described above solely by the fact that more vibration generator-convertors 25, 25a with sonotrodes 26 and with the corresponding chambers 27, 211 that hold the above-mentioned fluid 28 are used "in series" along the pipe 210, in such a way as to distribute the vibrations fairly uniformly along the entire length (which is greater than in the previous case) of the pipe 210 itself.

Figure 3:
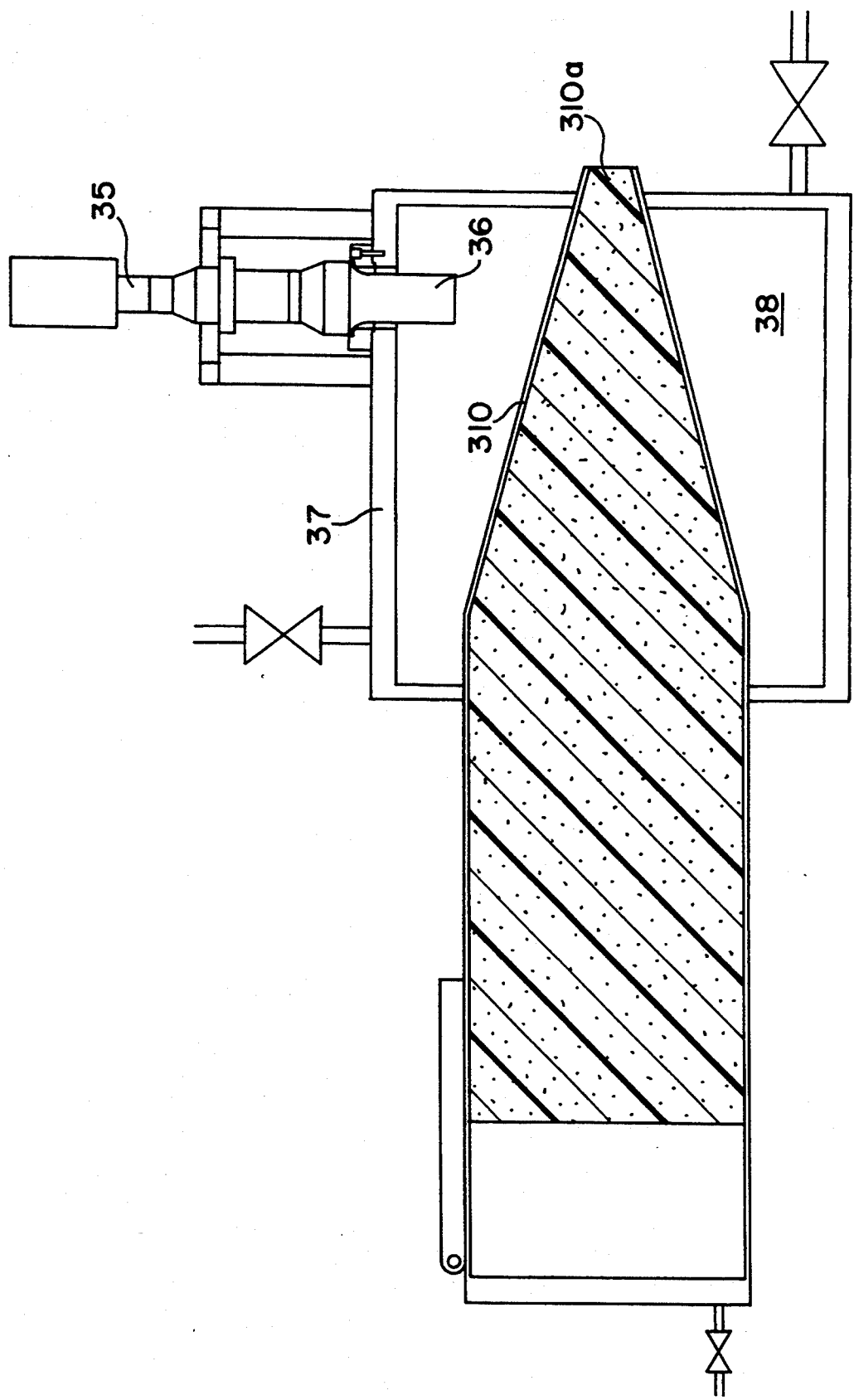
FIGS. 3 and 4 show other embodiments of the device which are adapted to carry, for example, butter.
Figure 4:
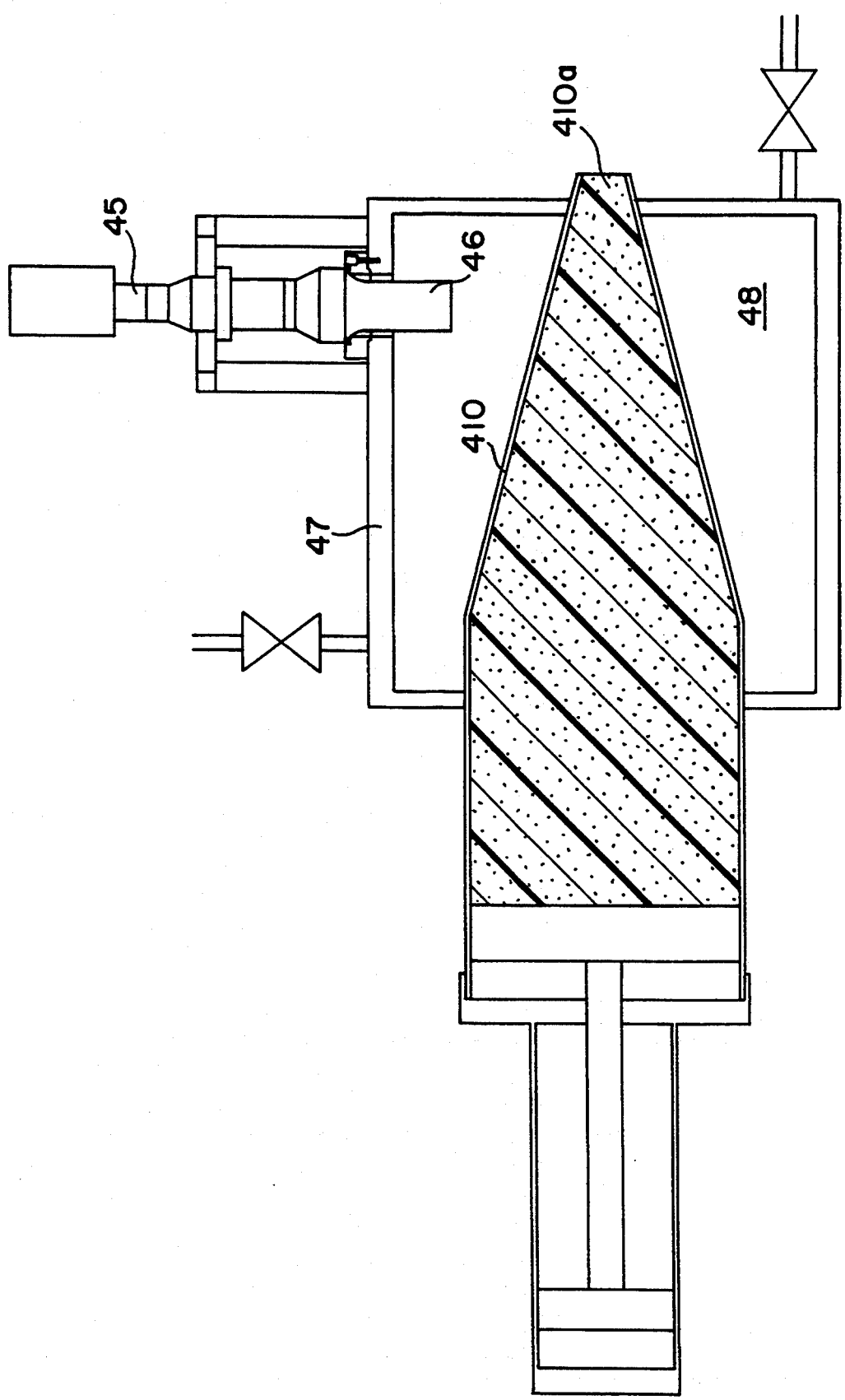

It is obvious that for each particular application the device can be made in the shape and configuration that are most appropriate for the various members. Similarly, it is also possible that the fluid 8, 28 may not be heated, such as in the case, for example, of the drawing of butter or wax shown in FIGS. 3 and 4, where a mechanical piston or a jet of compressed inert gas pushes the above-mentioned substances toward the outlet hole 310a, 410a of a pipe 310, 410, in which there is a chamber 37, 47 into which a sonotrode 36, 46 is inserted which is connected to a generator-converter 35, 45.

The vibrations can also be induced directly in the pipe 10, 210, without interposing a fluid-containing chamber, by using appropriately positioned piezoelectric elements. In addition, when the target temperature is very high as, for example, in the case of molten glass, the inventor calls for using mercury as the fluid, or for using the above-mentioned piezoelectric elements without interposing a fluid.

As we know, high-frequency vibrations induce cavitation phenomena in the material that comprises a sonotrode; this material is usually titanium, which exhibits good resistance to the above-mentioned phenomena.

In order to improve the ability of the sonotrodes that are part of the device to resist cavitation even further, the inventor has made provision for subjecting them to an ion implantation procedure, using for this purpose ions of the elements that are best suited to the conditions under which each sonotrode is to be used and the type of application.

It is thus obvious that the embodiments shown in the figures are only examples which are neither exhaustive or restrictive compared to devices produced in different ways, but still according to the concepts set forth in the attached claims.

We claim:

1. Device for transporting in the plastic state substances with a high coefficient of sliding and/or internal friction along a conveyor pipe wherein at least one vibration generator is used to cause the substances and the pipe to vibrate relative to one another, wherein each said at least one vibration generator extends into a fluid-containing chamber surrounding the pipe and contacts a fluid contained in said chamber, said fluid in turn being in contact with the pipe.

2. Device according to claim 1, in which said chamber is annular and is arranged coaxially outside said pipe.

3. Device according to claim 1, in which the vibration generator is a generator-converter equipped with a sonotrode located inside said chamber.

4. Device according to claim 1, in which said fluid is kept at a preset temperature and transfers its heat to said pipe.

5. Device according to claim 4, further comprising a mold (9, 29) disposed at an outlet of the pipe, and a second vibration generator contacting the mold.

6. Device according to claim 1, in which the fluid is mercury.

7. Device according to claim 1, in which said vibrations are transmitted to the pipe by piezoelectric devices that are brought into contact with the pipe.

* * * * *